United States Patent [19]

Yamamoto

[11] Patent Number: 4,923,213
[45] Date of Patent: May 8, 1990

[54] DRIVE MEMBER FOR PASSIVE SEAT BELT SYSTEM

[75] Inventor: Kazuo Yamamoto, Kanagawa, Japan

[73] Assignee: Nippon Seiko Kabushiki Kaisha, Tokyo, Japan

[21] Appl. No.: 266,069

[22] Filed: Nov. 2, 1988

[30] Foreign Application Priority Data

Nov. 12, 1987 [JP] Japan .......................... 62-173022[U]
Jul. 19, 1988 [JP] Japan ............................ 62-95201[U]

[51] Int. Cl.$^5$ ............................................. B60R 22/00
[52] U.S. Cl. .................................................... 280/804
[58] Field of Search ................ 280/802, 804; 297/469, 297/476, 479

[56] References Cited

U.S. PATENT DOCUMENTS

| | | | |
|---|---|---|---|
| 4,575,120 | 3/1986 | Volk et al. ........................... | 280/804 |
| 4,580,813 | 4/1986 | Hashimoto ............................ | 280/804 |
| 4,647,070 | 3/1987 | Yamamoto et al. ................ | 280/804 |

FOREIGN PATENT DOCUMENTS 175241  7/1987  Japan .
122756  8/1987  Japan .

*Primary Examiner*—Richard A. Bertsch
*Attorney, Agent, or Firm*—Wegner & Bretschneider

[57] ABSTRACT

A drive member is provided for a passive seat belt system. The drive member is adapted to slidably extend through a guide rail and to transmit a drive force to a webbing-carrying slider so as to selectively displace the slider between an occupant-restraining position and an occupant-non-restraining position. An end metal fitting for holding the slider at a free end portion of the drive member has been formed integrally with a main body of the drive member by die casting. Instead of the end metal fitting, an end member may be formed integrally with the main body by resin molding.

11 Claims, 5 Drawing Sheets

DRIVE MEMBER FOR PASSIVE SEAT BELT SYSTEM

BACKGROUND OF THE INVENTION (1) Field of the Invention:

This invention relates to a drive member for transmitting a drive force so as to cause a webbing-carrying slider to move and run in a passive seat belt system of the type that a restraining webbing is automatically applied to an occupant subsequent to his sitting in a seat.

(2) Description of the Relate Art:

In a passive seat belt system of the type that a webbing is automatically applied to an occupant subsequent to his sitting in a seat, a guide rail is generally mounted generally on the inner wall of a vehicle body and a slider with the webbing fastened at one end thereof to the slider is caused to move and run on and along the guide rail so as to either restrain or release the occupant.

FIG. 10 is an overall schematic view showing one example of such passive seat belt systems, in which a webbing 1 is secured at an outboard end thereof to a slider 4 by way of a buckle 3. The slider 4 selectively moves and runs between an occupant-restraining position and an occupant-non-restraining position on and along a guide rail 6. Designated at numeral 8 is a drive member which slidably extends through the guide rail 6. A basal end portion of the drive member 8 is selectively taken up by or paid off from a drive drum 9, while a free end portion of the drive member 8 is connected to the slider 4. Upon rotation of the drive drum 9, the drive member 8 therefore serves to transmit a force to the slider 4 so that the slider 4 is caused to move and run.

FIGS. 7 and 8 illustrate by way of example the front end portion of the drive member 8, at which the drive member 8 is connected to the slider 4. End metal fittings 82a,82b and slide collars 83 are provided integrally on a main body 81 of the drive member 8. The end metal fittings 82a,82b are adapted to limit movements of the slider 4 along the length of the drive member 8. The slide collars 83 are fitted on the main body 81 with a suitable clearance left between the slide collars 83 and the guide rail 6. FIG. 7 shows the state of connection between the drive member 8 and the slider 4 when the webbing 1 (see FIG. 10) is carried so as to restrain an occupant. The drive member 8 is driven in a direction indicated by arrow A, whereby the lower end face of the end metal fitting 82a at the side of the free end of the drive member 8 is brought into abutment against the slider 4 so as to cause the slider 4 to move and run in the direction indicated by arrow A.

When the webbing is carried to release the webbing, the drive member 8 is driven in a direction indicated by arrow B as depicted in FIG. 8 so that the upper end face of the end metal fitting 82b on the side of the basal end portion of the drive member 8 is brought into abutment against the slider 4 and the slider 4 is caused to move and run in the direction indicated by arrow B. Incidentally, FIG. 9 is a view as seen in a direction indicated by arrow C in FIG. 8.

As illustrated in FIGS. 6(a) and 6(b), the metal fittings 82a,82b have heretofore been formed by fitting a cylindrical crimp metal 84 on the drive member main body 81 having flexibility such as a wire rope, crimping the crimp metal 84 by a press and then enclosing the crimp metal fitting 84 within a resin (see Japanese Utility Model Laid-Open No. 122756/1987). FIG. 5(a) is a front view showing a free end portion of the drive member 8, where such conventional end metal fittings 82a,82b are provided. FIG. 5(b) is a cross-sectional view of the end metal fitting 82a provided on the side of the free end of the drive member 8, as viewed along line V(b)—V(b) of FIG. 5(a).

The conventional structure making use of such crimp metals however requires a step in which the crimp metals are fit on the main body of the drive member and are then crimped, resulting in cumbersome assembly and a higher manufacturing cost.

SUMMARY OF THE INVENTION

An object of this invention is therefore to solve the above-mentioned problems of the conventional structure.

In one aspect of this invention, there is thus provided a drive member for a passive seat belt system. The drive member is adapted to slidably extend through a guide rail and to transmit a drive force to a webbing-carrying slider so as to selectively displace the slider between an occupant-restraining position and an occupant-non-restraining position. An end metal fitting for holding the slider at a free end portion of the drive member has been formed integrally with a main body (81) of the drive member. Preferably, the end metal fitting is formed integrally with the main body by die casting.

In another aspect of this invention, an end member may be formed integrally with the main body by resin molding instead of the end metal fitting.

According to this invention, the end metal fitting or end metal member for holding the slider at the free end portion of the drive member is formed integrally with the main body of the drive member, preferably, by die casting or resin molding. Unlike the conventional art, the drive member according to this invention does not require the cumbersome step in which one or more crimp metal pieces are fitted on the main body of the drive member and are then pressed. This invention has therefore made it possible to reduce the manufacturing cost. Another advantage has also been brought about that the shape of each end metal fitting or end member can be designed freely so as to have the end metal fitting or end member conform in shape with the channel of the guide rail.

In addition, the die casting of each end metal fitting provides excellent strength, improved durability against repeated loads, less strength deterioration and dimensional changes, etc. compared to resin-made end fittings, and allows a compact shape.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1A:
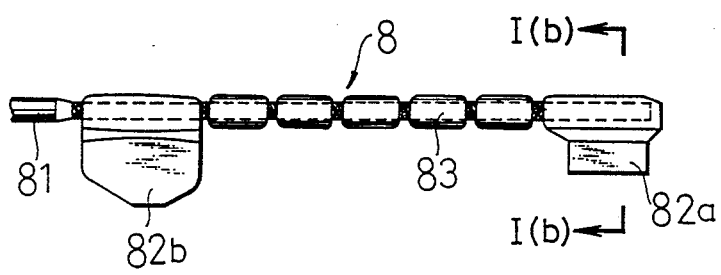
FIG. 1(a) is a fragmentary front view of a drive member according to a first embodiment of this invention.
Figure 1B:
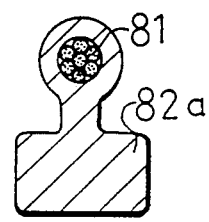
FIG. 1(b) is a cross-sectional view of the drive member as seen along line I(b)—I(b) of FIG. 1(a)

Referring first to FIGS. 1(a) and 1(b), the drive member according to the first embodiment of this invention will be described. End metal fittings 82a,82b are formed integrally by die casting on a wire rope 81 as a main body of the drive member. It is preferable to provide slide collars 83, which have a substantially ring-shaped transverse cross-section, on the wire rope 81 by die casting at the same time, because such simultaneous die casting leads to better workability and work efficiency and also to products of a smaller dispersion.

The end metal fittings formed integrally with the main body of the drive member by die casting as described above are made of a casting metal. They therefore have excellent characteristic features that their strength is higher than resin-made end members and is not reduced even climate conditions such as the temperature change.

Figure 2A:
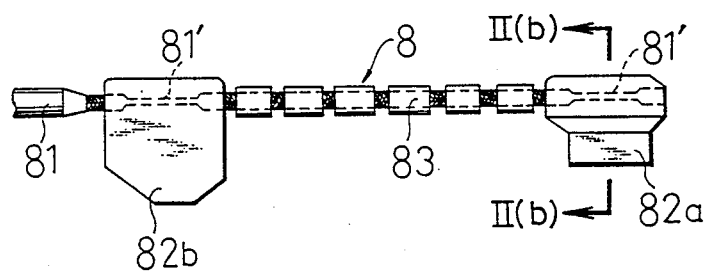
FIG. 2(a) is a fragmentary front view of a drive member according to a second embodiment of this invention.
Figure 2B:
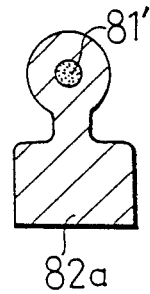
FIG. 2(b) is a cross-sectional view of the drive member according to the second embodiment as seen along line II(b)—II(b) of FIG. 2(a)

The drive member according to the second embodiment of this invention will next be described with reference to FIGS. 2(a) and 2(b). In the second embodiment, the wire rope 81 as a main body of the drive member defines a constricted slip-off preventing portion 81' at each of positions where the respective end metal fittings 82a,82b are formed integrally on the wire rope 81 by die casting. Although the slip-off preventing portions 81' have a constricted shape in the second embodiment, they may be in any shape so long as their cross-sectional shapes are different from the remaining portion of the main body to define one or more stepped portions.

Figure 3A:
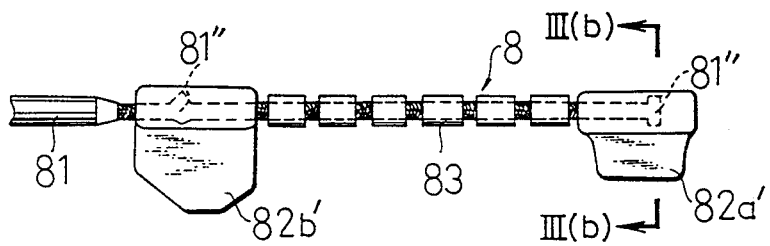
FIG. 3(a) is a fragmentary front view of a drive member according to a third embodiment of this invention.
Figure 3B:
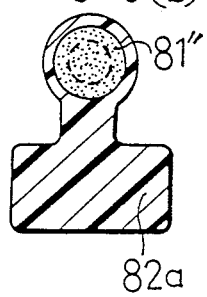
FIG. 3(b) is a cross-sectional view of the drive member according to the third embodiment as seen along line III(b)—III(b) of FIG. 3(a)

The drive member according to the third embodiment of this invention will be described with reference to FIGS. 3(a) and 3(b). In the third embodiment, end members 82a',82b' are formed integrally with the wire rope 81 as a main body of the drive member by resin molding. The wire rope 81 defines bulged slip-off portions 81" at the free end thereof and at a portion somewhat remote from the free end toward the basal end thereof, respectively. The former and latter slip-preventing portions 81",81" are covered by their corresponding end members 82a',82b' respectively.

Figure 4A:
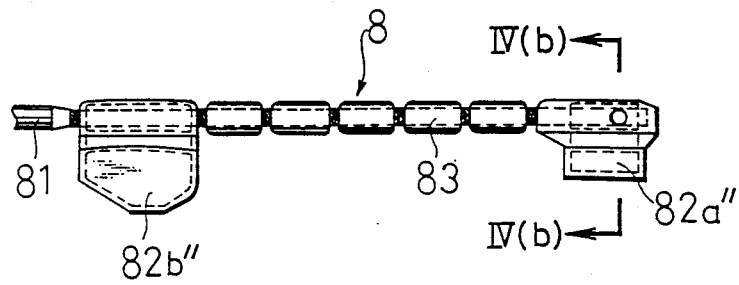
FIG. 4(a) is a fragmentary front view of a drive member according to a fourth embodiment of this invention.
Figure 4B:
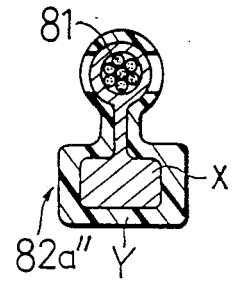
FIG. 4(b) is a cross-sectional view of the drive member according to the fourth embodiment as seen along line IV(b)—IV(b) of FIG. 4(a)
Figure 5A:
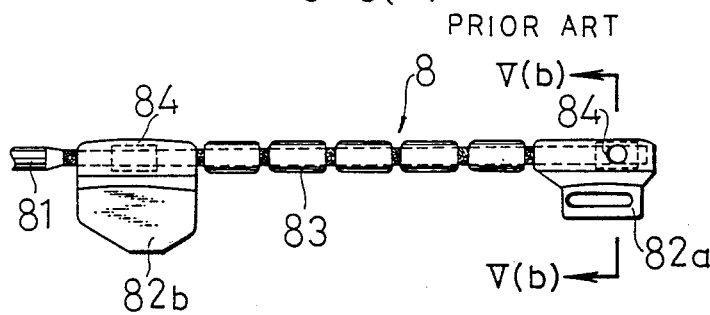
FIG. 5(a) is a fragmentary front view of a conventional drive member.
Figure 5B:
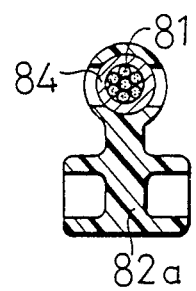
FIG. 5(b) is a cross-sectional view of the conventional drive member as seen along line V(b)—V(b) of FIG. 5(a)
Figure 6A:
FIG. 6(a) and FIG. 6(b) respectively show steps for the attachment of a conventional end metal fitting.
Figure 6B:
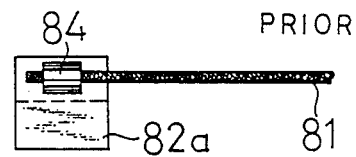
Figure 7:
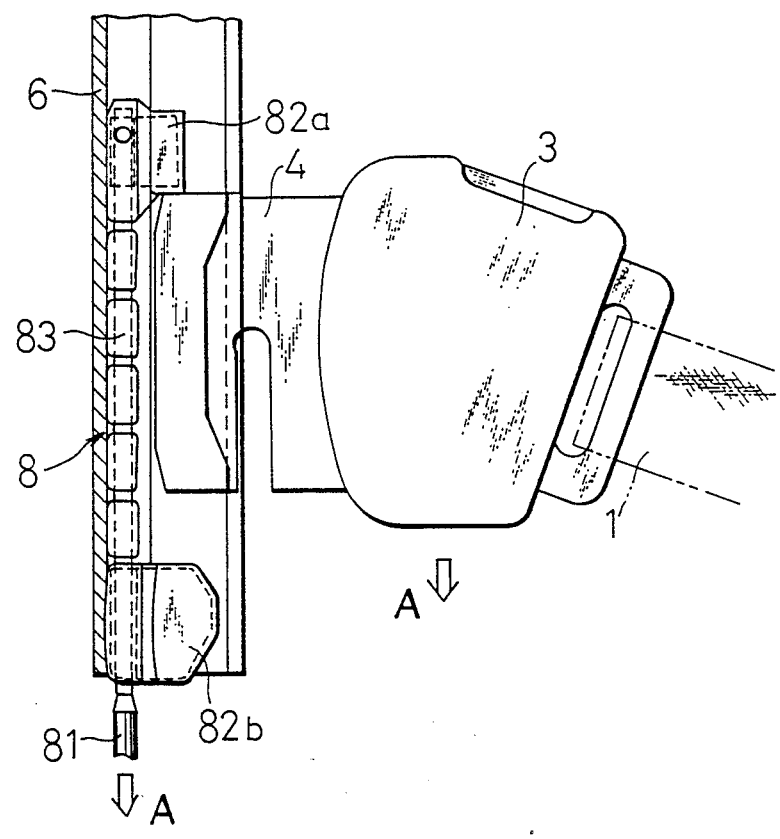
FIG. 7 illustrates the state of connection between a drive member and an associated webbing has been worn.
Figure 9:
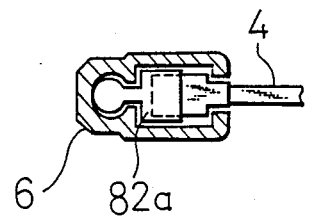
FIG. 9 is a drawing seen in a direction indicated by arrow C in FIG. 8.
Figure 8:
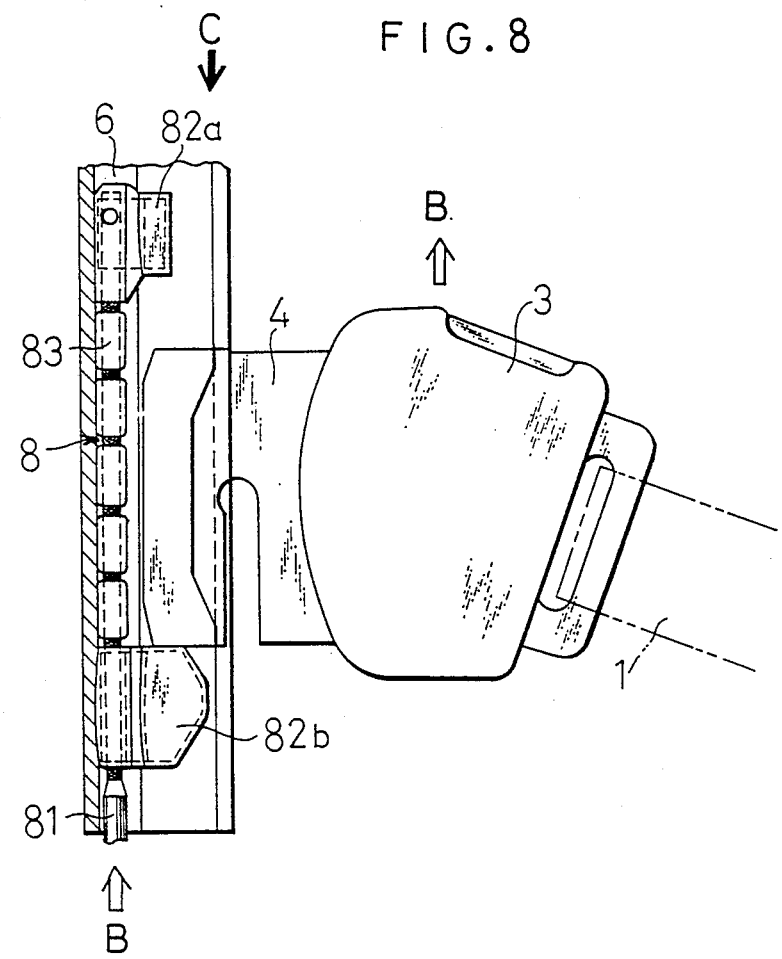
FIG. 8 depicts the state of connection between the drive member and the associated slider when an associated webbing has been released.
Figure 10:
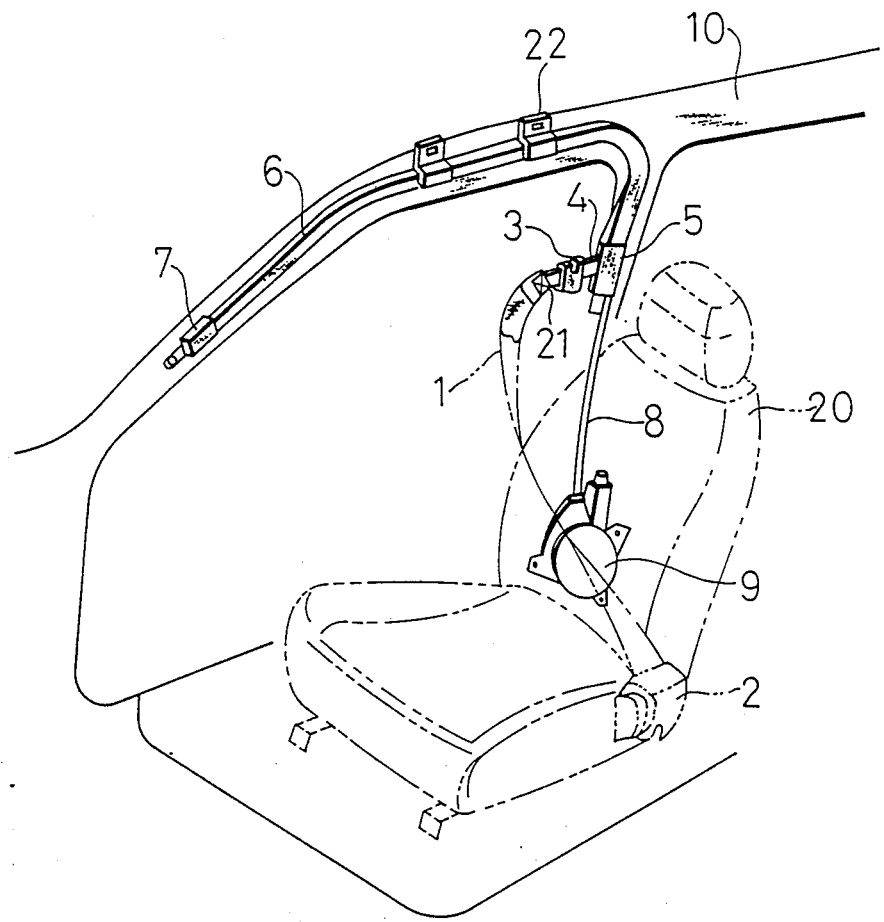
FIG. 10 illustrates by way of example the overall construction of a passive seat belt system.

Finally, the drive member according to the fourth embodiment of this invention will be described with reference to FIGS. 4(a) and 4(b). In the fourth embodiment, end members 82a",82b" are composed of a core portion X, which has been formed integrally on the wire rope 81 as a main body of the drive member by die casting, and an outer resin layer Y which has been molded over the circumference of the core X and covers the core X. The outer resin layer Y can reduce impacts and wearing so that the durability is improved. In addition, the outer resin layer Y is also effective in either preventing or reducing the noise when the drive member is in operation.

I claim:

1. A drive member for a passive seat belt system, said drive member being adapted to slidably extend through a guide rail and to transmit a drive force to a webbing-carrying slider so as to selectively displace the slider between an occupant-restraining position and an occupant-non-restraining position, characterized in that an end metal fitting for holding the slider at a free end portion of the drive member has been formed integrally with a main body of the drive member.

2. The drive member as claimed in claim 1, wherein the end metal fitting has been formed integrally with the main body by die casting.

3. The drive member as claimed in claim 1, wherein the main body of the drive member defines at the free end portion a slip-off preventing portion of a cross-sectional shape different from the remaining portion of the main body and the end metal fitting has been formed integrally with the main body while covering the slip-off preventing portion.

4. The drive member as claimed in claim 3, wherein the slip-off preventing portion has a shape constricted in comparison with the remaining portion.

5. The drive member as claimed in claim 3, wherein the slip-off preventing portion has a bulged shape.

6. The drive member as claimed in claim 3, wherein the end metal fitting is composed of a core portion, which has been formed integrally on the main body by die casting, and an outer resin layer which has been molded over the circumference of the core and covers the core.

7. The drive member as claimed in claim 1, wherein the end metal fitting comprises a first end metal fitting provided at a free end of the drive member and a second end metal fitting provided at a predetermined interval from the first metal fitting, and the slider is positioned between the first and second end metal fittings.

8. The drive member as claimed in claim 7, wherein a plurality of slide collars are formed integrally with the main body of the drive member between both the first and second end metal fittings.

9. The drive member as claimed in claim 8, wherein the slide collars has a substantially ring-shaped transverse cross-section.

10. A drive member for a passive seat belt system, said drive member being adapted to slidably extend through a guide rail and to transmit a drive force to a webbing-carrying slider so as to selectively displace the slider between an occupant-restraining position and an occupant-non-restraining position, characterized in that an end member for holding the slider at a free end portion of the drive member has been formed integrally with a main body of the drive member by resin molding.

11. The drive member as claimed in claim 10, wherein the main body of the drive member defines at the free end portion a slip-off preventing portion of a cross-sectional shape different from the remaining portion of the main body and the end member has been formed integrally with the main body while covering the slip-off preventing portion.

* * * * *